Oct. 6, 1953
A. D. ALTEMILLER
2,654,823
POPCORN MACHINE
Filed Sept. 15, 1948
2 Sheets-Sheet 1
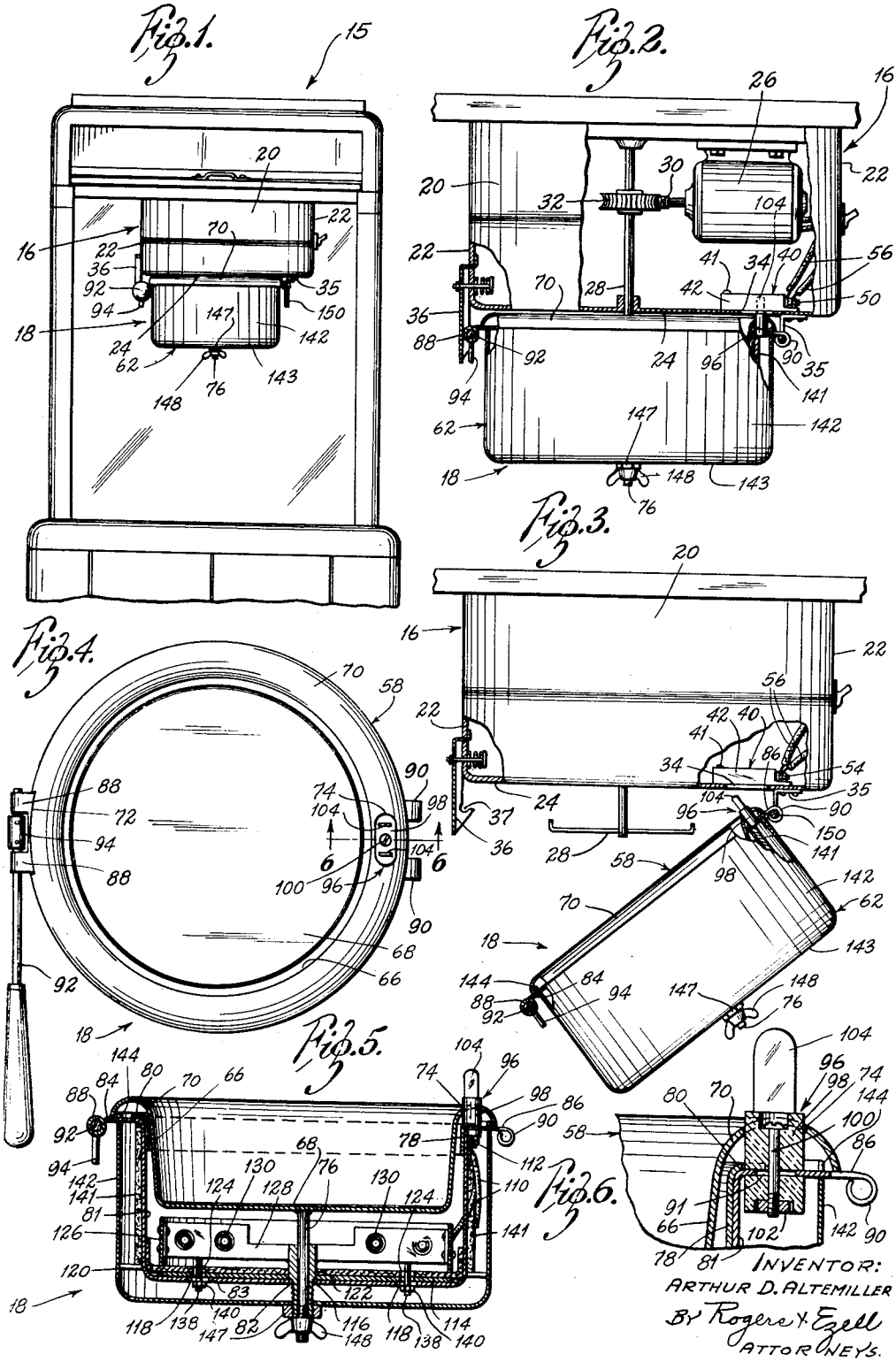
INVENTOR:
ARTHUR D. ALTEMILLER
By Rogers & Ezell
ATTORNEYS.

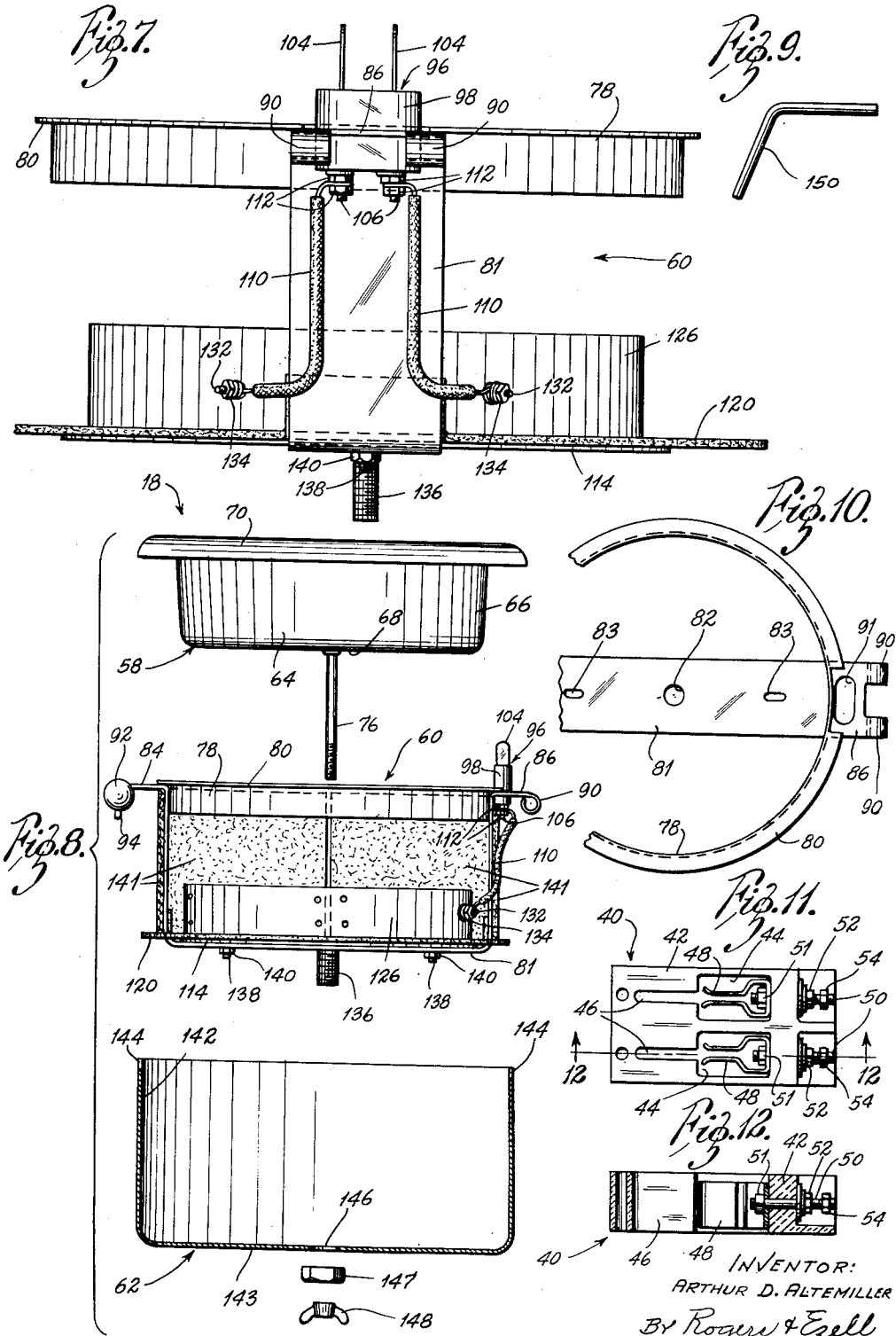

Patented Oct. 6, 1953

2,654,823

UNITED STATES PATENT OFFICE 2,654,823

POPCORN MACHINE

Arthur D. Altemiller, Affton, Mo., assignor to Hercules Steel Products Corporation, Galion, Ohio, a corporation of Delaware Application September 15, 1948, Serial No. 49,429

2 Claims. (Cl. 219—19)

The present invention relates generally to popcorn machines, although it will become evident that a number of its features are valuable in other apparatus, particularly cooking apparatus.

In the known types of popper constructions, the kettle is secured to the heating element so that it can be removed from the assemly only after a tedious and time-consuming operation, with the not infrequent result that the kettle is not removed and cleaned as often as it should be. Also, in the known constructions, the heater element is connected to a main circuit by flexible wires, and a constant bending of these wires, caused by the opening and closing of the popcorn assembly each time popcorn is removed and raw corn and oil added, causes the insulation on the wires to deteriorate and the wires themselves to break due to fatigue failure.

It is an object of the present invention, therefore, to provide a novel popper construction in which the popper kettle can be easily and quickly removed for cleaning.

Another object of the present invention is to provide a popper construction in which the heating element is separate from the kettle.

Another object of the present invention is to provide a popper construction in which the electrical circuit to the heater element is made through pressure contacts.

Another object of the present invention is to provide a popper assembly which can be easily and quickly disassembled for repair and replacement of the heater element.

More broadly, objects of the invention include the provision of a heating device and a container, both movable relatively to a base, with the container separable from the heating device, and with separable contacts between the movable heating device and container that are automatically closed together when the movable parts are brought into operating relationship to the base.

Further objects and advantages of the present invention will be apparent from the following description, reference being had to the accompanying drawings wherein a preferred embodiment of the present invention is shown, in which:

Fig. 1 is a rear elevational view of the upper portion of a popcorn machine showing a motor housing assembly, and popper assembly constructed in accordance with the teachings of the present invention;

Fig. 2 is an enlarged rear elevational view of the motor housing assembly and the popper assembly in closed position with portions of the motor housing and popper housing cut away to show the internal construction;

Fig. 3 is similar to Fig. 2, but with the popper in an open position;

Fig. 4 is an enlarged top plan view of the popper assembly with the hinge pin removed;

Fig. 5 is an enlarged diametrical sectional view of the popper assembly;

Fig. 6 is an enlarged fragmentary sectional view taken on the line 6—6 in Fig. 4;

Fig. 7 is an enlarged side elevational view of the popper frame assembly;

Fig. 8 is an enlarged exploded elevational view of the popper assembly, the popper housing being shown in cross section and the hinge pin and one of the asbestos strips being removed from the frame assembly;

Fig. 9 is an enlarged view of the removable hinge pin;

Fig. 10 is a fragmentary top plan view of the top ring and U-shaped bracket of the popper frame assembly;

Fig. 11 is an enlarged top plan view of the female member of the electrical contactor; and Fig. 12 is a side elevational view taken on the line 12—12 in Fig. 11.

In the description to follow, the inventions are described in connection with a popper, to which they have especial applicability. However, it is understood that in certain cases the features are to be construed for broader application, as will be evident.

Referring to the drawings more particularly by reference numerals, 15 indicates generally the upper portion of a popcorn machine which includes a motor housing assembly 16 and a popper assembly 18 constructed in accordance with the teachings of the present invention.

The motor housing assembly 16 includes a motor housing 20, having side walls 22 and a bottom wall 24, within which housing is mounted a motor 26 which, by means of a worm 30 and worm gear 32, drives an agitator 28 (Fig. 3) that depends below the housing assembly 16. An opening 34 is provided through the bottom wall 24 adjacent the edge thereof, for a purpose to appear. Adjacent the opening, and on the bottom wall 24, an angle bracket 35 is permanently attached. It has a cylindrical bearing formed in its lower end to receive a hinge pin, which will be described later. Diametrically opposite the bracket 35 on the lower part of the housing 20, a channel-shaped latch member 36 is pivotally mounted in the manner shown in Fig. 2. The latch member 36 has notches 37 formed in the lower end thereof for a purpose to be described hereinafter.

The female member 40 of a bayonet type electrical contactor is mounted by means of machine screws 41 on the inside of the bottom wall 24 in line with the opening 34. The female member 40, as shown in Figs. 11 and 12, includes an insulator body 42 having chambers 44 formed therein. Longitudinal slots 46 are formed in the bottoms of the chambers 44 and extend into the body adjacent one end of the chambers. Narrowed U-shaped blade-receiving contact elements 48 are disposed within the chambers 44 and are held in position by threaded rods 50 and nuts 51 and 52 mounted on opposite ends thereof. Nuts 54 are mounted on the ends of the rods 50 adjacent the nuts 52 for fastening insulated wires 56 thereto which lead to the main circuit (not shown).

The popper assembly 18 (Fig. 8) includes a kettle 58 and a frame assembly 60 mounted within a popper housing 62.

The kettle 58 (Fig. 5) has a cup-shaped body portion 64 with a substantially vertical wall 66 and a flat bottom 68. An annular flange 70 is formed integral with the top edge of the wall 66 and extends outwardly and downwardly therefrom. The flange 70 has an elongated notch 72 formed in its outer edge, and diametrically opposite therefrom there is an opening 74 (Fig. 4). A rod 76, which is threaded on the lower end, extends downwardly normal to the kettle bottom 68 and is secured thereto as by welding.

The frame assembly 60 (Figs. 7, 8 and 10) includes a top ring 78 which has an outwardly extending flange portion 80 formed integrally with the upper edge thereof. A U-shaped bracket 81 depends from the ring 78, to which the upper ends of its legs are attached by spot welding. It has an opening 82 centrally of its bottom portion. The opening 82 is flanked by a pair of slots 83 in the bottom of the cross member. The upper ends of the legs of the bracket 81 extend outwardly from the ring 78 providing tabs 84 and 86. The outer ends of the tabs 84 and 86 are rolled and notched to form cylindrical bearings 88 and 90, respectively, and an opening 91 is contained within the tab 86. As will be described, the bearings 90 cooperate with the bearing loop on the bracket 35 for supporting the popper assembly 18 on the motor housing 20. A handle member 92 (Fig. 4), with a pin 94 formed normal thereto near one end, is pivotally mounted in the bearing 88 for a purpose to be described hereinafter.

The male member 96 of a bayonet type electrical contactor is secured to the tab 86, as shown in Fig. 6. The member 96 has a split body 98, the upper portion of which is disposed above the tab 86 and the bottom portion of which is disposed below it, the two being held together by a bolt 100 which passes through the opening 91 and is engaged by a nut 102. A pair of contact blades 104 extend upwardly from the top of the body 98, and a pair of threaded studs 106 (Fig. 7) depend from the bottom thereof, the studs 106 being connected to the blades 104 within the body 98. The upper ends of a pair of insulated wires 110 are disposed around the studs 106 and secured thereto by nuts 112.

A disc 114, with an opening 116 in the center thereof and diametrically opposed slots 118 on either side of said opening, is disposed within the U-shaped bracket 81 so as to rest upon the top of the cross member, the opening 116 and slots 118 coinciding with the opening 82 and slots 83, respectively, in the cross member. A disc 120 of insulating material, such as asbestos fiber, is disposed on top of the disc 114, the former having an opening 122 and slots 124 formed therein which coincide with the holes and slots in the disc 114 and bracket 81.

A heater assembly is mounted within the frame 60 to be supported upon the discs 120 and 114, and hence by the U-shaped bracket 81. The heater assembly includes a supporting ring or shallow cylinder 126 with a diametrical member 128 (Fig. 5) and a series of similar radial members (not shown) secured to the inner surface thereof. A resistive heater element 130 (Fig. 5) is supported by the diametrical member 128 and the radial members, and the ends thereof are secured to insulated threaded studs 132 (Figs. 7 and 8) which extend through the wall of the ring 126. The lower ends of the insulated wires 110 are secured to the outer ends of the studs 132 by nuts 134.

An externally threaded tube 136 is secured by welding to the diametrical member 128 at the center thereof; and it extends downwardly through the openings 122, 116 and 82.

Two threaded studs 138 (Figs. 5 and 8) are secured to the diametrical member 128 approximately midway between the tube 136 and the ring 126 and extend downwardly through the slots 124, 118 and 83 (Fig. 5). Nuts 140 are disposed on the ends of the studs 138 so as to hold together the U-shaped bracket 81, the disc 114, the disc 120 and the heater element supporting ring 126.

The disc 120 and the flanged ring 78 constitute spaced annular bottom and top supports for insulating material that provides side walls for the frame and a lining for the sides of the popper housing. This insulating material is here shown as a pair of sheet portions 141 of asbestos fibers, disposed around the frame between the disc 120 and the flanged ring 78, each sheet or strip 141 extending approximately 180° around the periphery of the frame 60.

The popper housing 62 (Fig. 8) is cup-shaped and has a vertical wall 142 and a flat bottom 143. The wall 142 has diametrically opposed elongated notches 144 in the upper edge thereof, to accommodate the tabs 84 and 86, and the bottom 143 has an opening 146 in the center.

It is desirable to have the housing 62 large enough to provide an air space around the outside of the frame assembly 60, as appears in Fig. 5.

A jam nut 147 is disposed on the tube 136 adjacent the bottom 142 of the popper housing 62, and a wing nut 148 is disposed on the lower end of the rod 76.

A removable hinge pin 150, as shown in Fig. 9, is disposed in the bearing 90 of the tab 86 and the bearing in the bracket 38 so as to pivotally secure the popper assembly 18 to the motor housing assembly 16.

To operate the popper assembly in order to remove the popcorn or to add raw corn and oil, the handle member 92 is rotated in a clockwise direction, causing the pin 94 to engage the lower end of the latch member 36 and to pivot it outwardly, thereby disengaging the notches 37 from the bearings 88 and permitting the popper assembly 18 to pivot downwardly about the hinge pin 150.

As the popper assembly 18 pivots downwardly, the contact blades 104 slide from between the jaws of the blade receiving elements 48 and pass downwardly through the slots 46, thereby breaking the circuit to the heater element 130. Because of the light pressure between the sliding parts of the contactor, the wear is negligible and can be easily compensated for, if necessary, by pressing the jaws of the blade receiving elements 48 closer together.

The popper is closed by grasping the handle member 92 and pivoting the popper assembly 18 upwardly about the hinge pin 150 so as to cause the bearings 88 to force the bottom of the latch member 36 away from the housing 20, thereby permitting the bearings 88 to engage the notches 37 and secure the popper in a horizontal position.

As the popper assembly swings upwardly, the contact blades 104 pass upwardly through the slots 46 and enter into engagement with the blade receiving elements 48, thereby closing the circuit to the heater element 130. By this means, assuming master control switches (not shown) to be closed, the heating element is automatically energized and deenergized in accordance with the position of the food container.

To disassemble the popper assembly 18 in order to clean the kettle 58 or repair the heater element 130, the popper assembly 18 is first swung to the open positions and the hinge pin 150 removed, thereby disengaging the popper assembly from the motor housing assembly. The wing nut 148 is then removed from the rod 76, thereby freeing the rod 76 and permitting the kettle 58 to be lifted off the top of the assembly for washing and cleaning. If desired, the kettle 58 could be removed from the assembly while it remains hinged to the motor housing assembly.

After the wing nut 148 has been removed, the jam nut 147 can be removed from the tube 136, thereby permitting the popper housing 62 to be removed.

The strips 141 of insulating material can then be removed, thereby completely exposing the heater element 130 and its supporting structure.

The apparatus can be further dismantled by removing the nuts 138 which permit the removal of the heater element and its supporting ring 126, thereby freeing the discs 120 and 114.

Thus, by merely removing the wing nut 148, the popper kettle can be removed from the assembly, and, by removing a few additional nuts, the entire popper housing assembly 18 can be dismantled for inspection and repair.

From the description, it will be seen that a heating container, particularly desirable as a food cooker, is movably mounted relatively to a base, that also constitutes a support for the container, and a closure for the same. The heater is movable with the movable container, but without the use of wire or like connections. The food containing element or bowl is separately and easily removed from the heating element, and yet is in close promixity thereto and above the same. In machines such as popcorn poppers, requiring an additional product treating device such as the movable agitator, the heavy moving parts are supported in a fixed base, whereas the relatively lighter food container and heater are movably mounted.

In a broader sense, the heating means represents a particular apparatus for acting upon the contents of the container, and while novelty is considered to reside in the present arrangement of the heater, the claims are intended unless otherwise specified, to include other apparatus for treating the contents of the bowl.

It is to be understood that the foregoing description and the accompanying drawings have been given by way of illustration and example only, and that changes and alterations in the present disclosure, which will be readily apparent to one skilled in the art, are contemplated as within the scope of the present invention which is limited only by the claims which follow.

What is claimed is:

1. In a popcorn machine, a fixed supporting assembly, and a movable popper assembly hinged to the supporting assembly, said popper assembly being adapted selectively to occupy either an operating or a non-operating position relative to said supporting assembly, said popper assembly comprising a kettle and electrical means for heating the kettle, said electrical means including one member of a bayonet type electrical contactor, there being a complementary member of the contactor in fixed relation to said supporting assembly, said respective contactor members being positioned for either conducting contact or non-conducting separation in accordance with the selected position of the popper assembly, said popper assembly further comprising a frame assembly for receiving said kettle in nested relationship, said kettle having an outwardly extending annular flange for overlying abutment with said frame assembly, said flange having an opening therein, said one contactor member being mounted on said frame and extending upwardly through said opening for the aforementioned selective engagement of the contactor members, and a single readily releasable fastening element for retaining the kettle in the frame, the kettle being thereby readily removable from the remainder of the popper assembly.

2. In a popcorn machine, a fixed supporting assembly, and a movable popper assembly hinged to the supporting assembly, said popper assembly being adapted selectively to occupy either an operating or a non-operating position relative to said supporting assembly, said popper assembly comprising a kettle and electrical means for heating the kettle, said electrical means including one member of a bayonet type electrical contactor, there being a complementary member of the contactor in fixed relation to said supporting assembly, said respective contactor members being positioned for either conducting contact or non-conducting separation in accordance with the selected position of the popper assembly, said two contactor members comprising a male member and a female member, said male member including a pair of knife-like contact blades supported in an insulator body and extending in parallel arrangement therefrom, said female member including an insulator body having a pair of rectangular chambers in side-by-side arrangement therein, and a narrowed U-shaped blade-receiving contact element in each of said chambers, said female insulator body further having a slot coextensive with each chamber for pivotal access of said blade to said blade-receiving element.

ARTHUR D. ALTEMILLER.

References Cited in the file of this patent

UNITED STATES PATENTS

| Number | Name | Date |
|---|---|---|
| Re. 20,570 | Bushway | Dec. 7, 1937 |
| 1,633,391 | Beskin | June 21, 1927 |
| 1,884,637 | Feehan | Oct. 25, 1932 |
| 1,961,812 | Burch | June 5, 1934 |
| 2,027,698 | Parks | Jan. 14, 1936 |
| 2,119,421 | Cross | May 31, 1938 |
| 2,214,630 | Wheeler | Sept. 10, 1940 |
| 2,232,954 | Manley | Feb. 25, 1941 |
| 2,244,580 | Smith | June 3, 1941 |
| 2,516,503 | Bock | July 25, 1950 |